(12) United States Patent
Sugano

(10) Patent No.: US 6,508,230 B2
(45) Date of Patent: Jan. 21, 2003

(54) REVOLUTION NUMBER CONTROL SYSTEM FOR ENGINE

(75) Inventor: Kiyoyuki Sugano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/906,788

(22) Filed: Jul. 18, 2001

(65) Prior Publication Data
US 2002/0020390 A1 Feb. 21, 2002

(30) Foreign Application Priority Data
Jul. 18, 2000 (JP) ........................................ 2000-217987

(51) Int. Cl.[7] .................................................. F02P 9/00
(52) U.S. Cl. .................. 123/335; 123/406.47; 123/679; 123/687
(58) Field of Search ................................. 123/321, 322, 123/332, 333, 334, 335, 679, 687

(56) References Cited

U.S. PATENT DOCUMENTS

| 4,883,033 A | * | 11/1989 | Hosoe et al. ............... 123/335 |
| 5,062,401 A | * | 11/1991 | Suganuma ............... 123/198 D |
| 5,105,783 A | * | 4/1992 | Nussbaum et al. ......... 123/335 |
| 5,282,137 A | * | 1/1994 | Suzuki et al. ............... 123/333 |
| 5,355,972 A | * | 10/1994 | Wataya ....................... 123/319 |
| 5,559,703 A | * | 9/1996 | Iwata et al. ................. 123/333 |
| 6,104,977 A | * | 8/2000 | Avery, Jr. .................... 123/322 |
| 6,263,856 B1 | * | 7/2001 | Weber et al. ............... 123/352 |
| 6,397,817 B1 | * | 6/2002 | Yoshida et al. ......... 123/406.47 |

FOREIGN PATENT DOCUMENTS

JP 2917057 4/1999

* cited by examiner

Primary Examiner—John Kwon
(74) Attorney, Agent, or Firm—Birch, Stewart, Kolasch & Birch, LLP

(57) ABSTRACT

A revolution number control system includes ignition timing delay controlling means for delaying ignition timing from the ignition advance amount n at first prescribed value n2 when the engine revolution number NE is between the first prescribed value n2 and a clutch-on revolution number n4. The first prescribed value n2 is a predetermined revolution number smaller than a present revolution number and the clutch-on revolution number n4 is the present revolution number, and the revolution number control system 40 controls the revolution number by operating the ignition timing delay controlling means when a throttle opening sensor does not detect a change in the throttle opening.

11 Claims, 4 Drawing Sheets

REVOLUTION NUMBER CONTROL SYSTEM FOR ENGINE

BACKGROUND OF THE INVENTION

1. Field of the Invention

The present invention relates to revolution number control systems for engines, and preferably, revolution number control systems for engines having centrifugal clutches.

2. Related Art

As a revolution number control system for controlling the revolution number of an engine, there has been known, for example, Japanese Patent No. 2917057 "Starting-Time Revolution Number Control System".

FIG. 5 of the above publication shows a graph of revolution number control by a starting-time revolution number control system which gradually increases a corrected value of the amount of fuel supplied to an internal combustion engine from a predetermined engine revolution number CVEN toward a connection engine revolution number CEN of a clutch mechanism.

In the starting-time revolution number control system above-mentioned, connection of the clutch mechanism is prevented by lowering the engine revolution number through increasingly correcting the amount of fuel. Therefore, for example, the fuel injected from a fuel injection valve adheres to and stagnates on inside walls of an intake pipe. Therefore, all the injected fuel does not immediately reach into the combustion chamber, so that combustion conditions are changed. Moreover, it is difficult to accurately control the engine revolution number.

SUMMARY OF THE INVENTION

An object of the present invention is to accurately control the engine revolution number so that the revolution number does not needlessly increase to the engine revolution number at the time of connection of a centrifugal clutch, in a revolution number control system for an engine.

In order to attain the above object, provided are a revolution number control system for an engine comprising a centrifugal clutch connected when the engine revolution number reaches a preset revolution number, and throttle opening change detecting means for detecting a change in the throttle opening of the engine. The revolution number control system comprises ignition timing delay controlling means for delaying ignition timing from the ignition timing at a first predetermined revolution number when the engine revolution number is between a first predetermined revolution number and a second predetermined revolution number, where the first predetermined revolution number is a predetermined revolution number smaller than the preset revolution number and the second predetermined revolution number is the preset revolution number. The revolution number control system controls revolution number by operating the ignition timing delay controlling means when the throttle opening change detecting means does not detect a change in the throttle opening.

With the ignition timing delay controlling means, ignition timing is delayed from the ignition timing at the first predetermined revolution number when the throttle opening change detecting means does not detect a change in throttle opening and the engine revolution number is between the first predetermined revolution number and the second predetermined revolution number. Accordingly, the engine revolution number is prevented from reaching the second predetermined revolution number, and needless connection of the centrifugal clutch is prevented.

Therefore, in comparison to the conventional system in which a rise in the engine revolution number is prevented by increasingly correcting the amount of fuel, the system of the present invention can control the engine revolution number with high accuracy without being affected by stagnation of fuel in the intake pipe or the like.

According to another principle of the present invention, the ignition timing delay controlling means increases the delay amount of ignition timing according to an increase in revolution number from the first predetermined revolution number.

The first predetermined revolution number is set, for example, in the vicinity of an idle revolution number, whereby the delay amount in the vicinity of the idle revolution number is made small, and variation of revolution is thereby restrained. In addition, the delay amount is increased as the increase in the revolution number from the first predetermined revolution number is larger, whereby the engine revolution number is swiftly lowered.

According to yet another principle of the present invention, the fuel supply amount reducing means for reducing the amount of fuel supplied to the engine at the time of delaying the ignition timing by the ignition timing delay controlling means is provided, in addition to the ignition timing delay controlling means in an engine provided with a catalyst for cleaning exhaust gas.

When the ignition timing is delayed, the temperature of exhaust gas is raised due to after-burning; however, by reducing the amount of fuel, the rise in the temperature of the exhaust gas is restrained, and the temperature of the catalyst is prevented from excessively rising. As a result, life of the catalyst can be extended.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
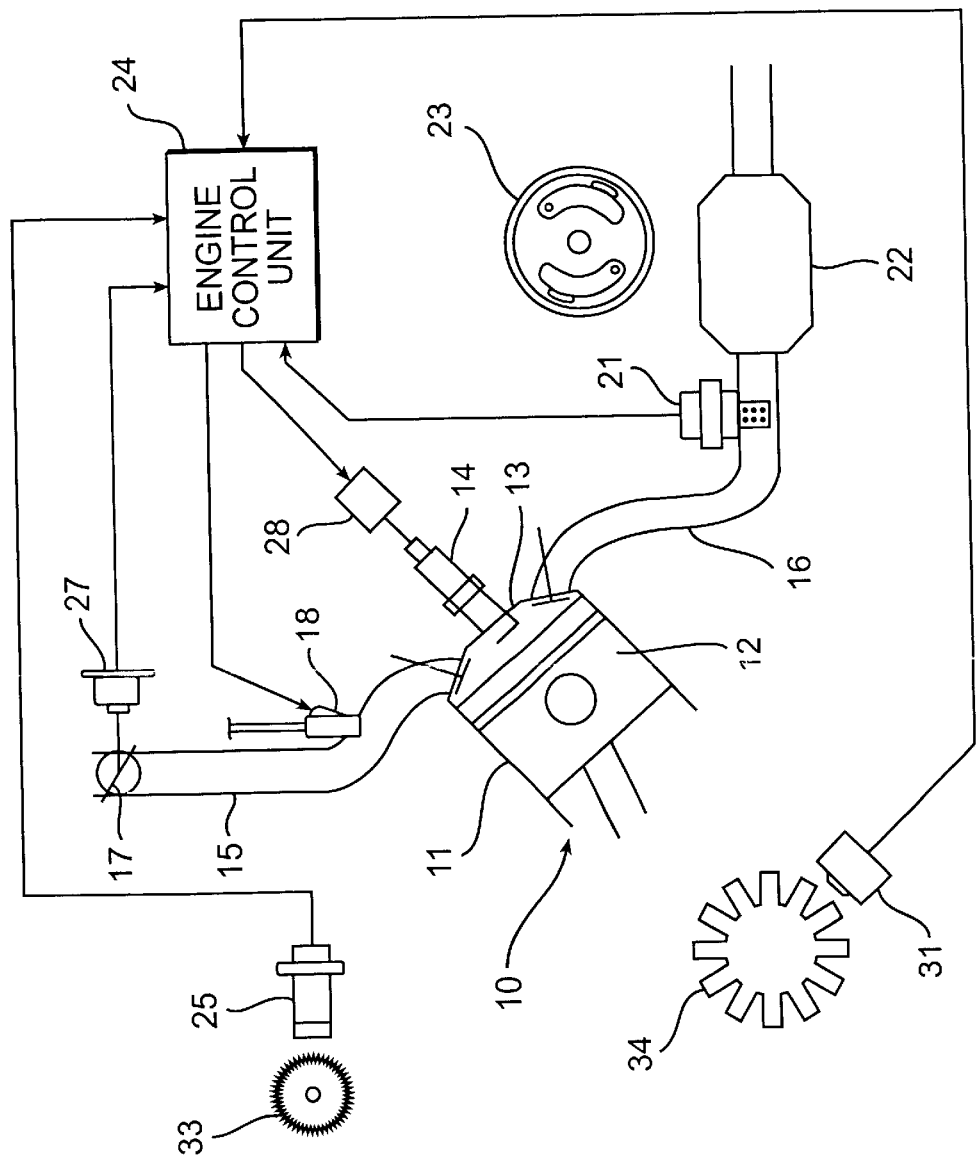
FIG. 1 an illustration of a major part of an engine according to the present invention.

FIG. 1 is an illustration of a major part of an engine according to the present invention, in which a piston 12 is movably inserted in a cylinder 11 of the engine 10. A cylinder head 13 is fitted to an upper portion of the cylinder 11, an ignition plug 14 is fitted to the cylinder head 13, an intake pipe 15 and an exhaust pipe 16 are connected to the cylinder head 13. Moreover, a throttle valve 17 and a fuel injection valve 18 are fitted to the intake pipe 15 in this order from the upstream side of intake, an 02 sensor 21 is fitted to the exhaust pipe 16, a catalyst 22 is provided in an intermediate portion of the exhaust pipe 16, and a centrifugal clutch 23 connected when the engine revolution number reaches a preset revolution number is provided between the output side of the engine 10 and wheels (not shown). Further, a vehicle speed sensor 25, a throttle opening sensor 27 as throttle opening change detecting means for detecting the opening (throttle opening) of the throttle valve 17, the fuel injection valve 18, an igniter 28 connected to the ignition plug 14, the $O_2$ sensor 21 and a crank angle sensor 31 are connected to a revolution number control system (described later) provided in an engine control unit 24.

The igniter 28 includes an ignition coil. Reference numeral 33 denotes a gear and 34 denotes a crank rotor, which are provided with recesses and projections at the outer peripheral portions thereof, and when they are rotated, the vehicle speed sensor 25 and the crank angle sensor 31 generate a vehicle speed signal and a crank angle signal, respectively.

Figure 2:
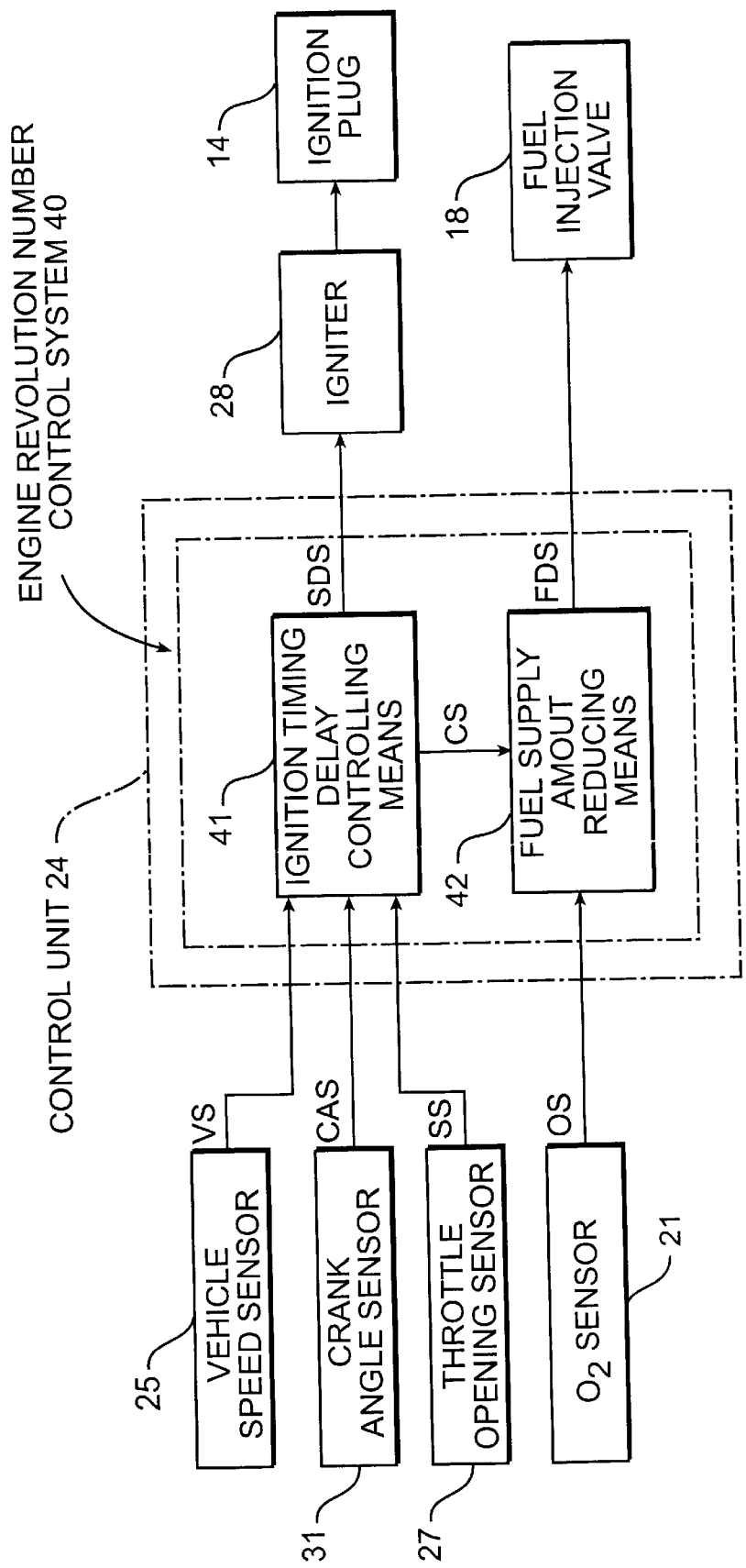
FIG. 2 is a block diagram illustrating a revolution number control system for the engine according to the present invention.

FIG. 2 is a block diagram illustrating the revolution number control system for the engine according to the present invention. The engine revolution number control system 40 comprises ignition timing delay controlling means 41 for delaying ignition timing at or above the engine revolution number (described later), and fuel supply amount reducing means 42 for reducing the amount of fuel supplied to the engine by receiving a control signal CS from the ignition timing delay controlling means 41.

The engine revolution number control system 40 may be provided separately from the engine control unit 24 instead of being provided in the engine control unit 24.

The ignition timing delay controlling means 41 feeds the igniter 28 with an ignition timing delay signal SDS for delaying the ignition timing based on the vehicle speed signal VS from the vehicle speed sensor 25, a crank angle signal CAS from the crank angle sensor 31 and a throttle opening signal SS from the throttle opening sensor 27; ignition at the ignition plug 14 is carried out based on the ignition timing delay signal SDS.

The fuel supply amount reducing means 42 receives the control signal CS at the time of delay of the ignition timing by the ignition timing delay controlling means 41, and feeds the fuel injection valve 18 with a fuel amount decrease signal FDS based on the control signal CS. Therefore, the fuel injected from the fuel injection valve 18 is thinned out (decreased). Moreover, the concentration of oxygen in the exhaust gas formed after combustion of the injected fuel is detected by the $O_2$ sensor 21, and the decrease amount of the fuel amount is finely adjusted based on an oxygen concentration signal OS from the $O_2$ sensor 21.

Figure 3:
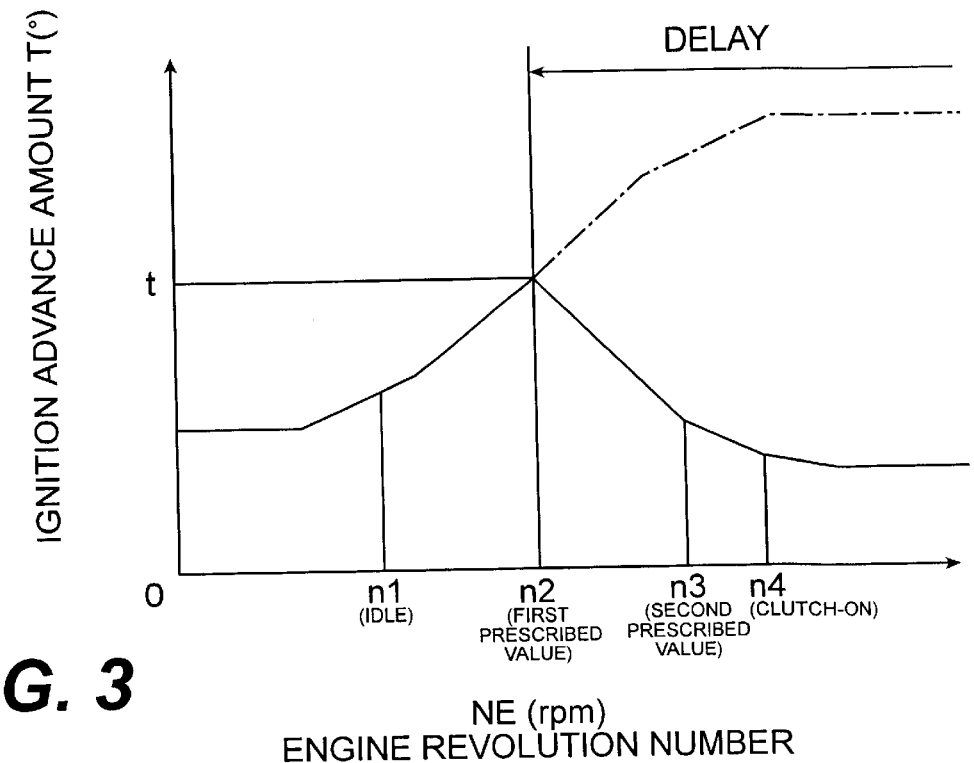
FIG. 3 is a graph illustrating the delay control of ignition timing delay controlling means in the revolution number control system for the engine according to the present invention.

FIG. 3 is a graph illustrating the delay control of the ignition timing delay controlling means in the revolution number control system for the engine according to the present invention. As seen in the figure, the axis of ordinate is ignition advance amount T (unit is °) and the axis of abscissa is the engine revolution number NE (unit is rpm). The graph corresponds to the case where the throttle opening is fully closed.

As seen in FIG. 3, n1 is an idle revolution number, and when the engine revolution number NE is increased, the ignition advance amount T gradually increases and, ordinarily, the ignition advance amount T further increases as shown by the imaginary line. The ignition timing delay controlling means 41 (See FIG. 2) of the present invention so functions that, when the engine revolution number NE reaches a first prescribed value n2 as a first predetermined revolution number, the ignition advance amount T is T=t, and the ignition advance amount T begins to decrease from the ignition advance amount t, namely, the delay amount is begins to increase. After the engine revolution number NE exceeds a second prescribed value n3 and, further, the engine revolution number NE reaches a revolution number n4 where the centrifugal clutch 23 (See FIG. 1) is connected (clutchon), the ignition advance amount T is slightly reduced, and is made to level off. Namely, n4 is the clutch-on revolution number as a second predetermined revolution number.

For example, the first prescribed value n2 is 1700 rpm, the second prescribed value n3 is 2000 rpm, and the clutch-on revolution number n4 is 2200 to 2700 rpm.

As described above, when the ignition advance amount, namely, the ignition timing is delayed, combustion speed of fuel is reduced, the engine output is lowered, the engine revolution number is lowered, and the decrease amount of and the decreasing speed of the engine revolution number is increased as the delay amount increases.

Besides, to change the ignition timing is to change the data stored in a ROM (read only memory) constituting the ignition timing delay controlling means 41 in the engine revolution number control system 40, without changing the constitution of parts of the igniter. Therefore, the engine revolution number control system 40 can be constituted in a simple design, and cost-up from the existing parts can be reduced.

As described above, the present invention is characterized in that the ignition timing delay controlling means 41 increases the delay amount of the ignition timing according to the increase of the revolution number from the first prescribed value n2.

With this arrangement, by setting the first prescribed value n2 at a revolution number close, for example, to the idle revolution number n1, variation of revolution can be restrained by reducing the delay amount in the vicinity of the idle revolution number n1 when the engine revolution number NE is raised from the idle revolution number n1 to or above the first prescribed value n2 for some reason. Besides, the delay amount is enlarged as the increase of the revolution number from the first prescribed value n2 is larger, whereby the engine revolution number can be swiftly lowered so as not to reach the clutch-on revolution number n4.

Figure 4:
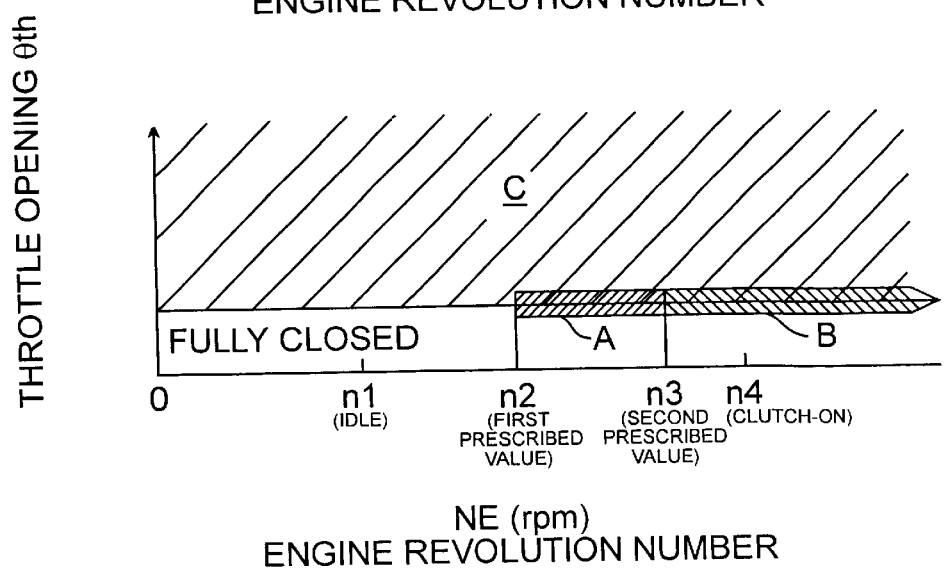
FIG. 4 is a graph illustrating the amount reduction control of fuel supply amount reducing means in the revolution number control system for the engine according to the present invention.

FIG. 4 is a graph illustrating the amount reduction control of the fuel supply amount reducing means in the revolution number control system for the engine according to the present invention. As is seen in the figure, the axis of ordinate is throttle opening θ th, and the axis of abscissa is engine revolution number (unit is rpm).

In a region A where the engine revolution number NE is not less than the first prescribed value n2 and less than the second prescribed value n3 and the throttle opening θ th is fully closed, the fuel supply amount reducing means 42 (See FIG. 2) reduces by ½ (½ cut) the amount of fuel injected from the fuel injection valve 18.

In addition, in a region B where the engine revolution number NE is not less than the second prescribed value n3 and the throttle opening θ th is fully closed, the fuel supply amount reducing means 42 fully reduces (fully cuts) the amount of fuel injected from the fuel injection valve 18.

Further, in a region C other than the region where the throttle opening θ th is fully closed, the fuel supply amount reducing means 42 does not reduce the amount of fuel injected from the fuel injection valve 18.

As described above, when the amount of fuel supplied is reduced, similarly to the case of delaying the ignition timing, the combustion rate of the supplied fuel is lowered, the output of the engine is lowered, and the engine revolution number is lowered. The lowering amount and the lowering speed of the engine revolution number is enlarged as the reduction of the amount of fuel supplied is larger.

However, when the reduction in the amount of fuel supplied is enlarged, combustion becomes instable and variation of revolution is increased. Therefore, the delaying of the ignition timing and the reduction of the amount of fuel supplied are simultaneously carried out, whereby variation of revolution can be suppressed.

Hitherto, the engine revolution number has been lowered by increasing the amount of fuel. In that case, it is considered that imperfect combustion occurs due to the rich gaseous mixture, and the amount of unburned gas in the exhaust gas increases.

On the other hand, where the engine revolution number is lowered by reducing the amount of fuel supplied as according to the present invention, the above problem in the prior art is obviated, and fuel consumption can be improved.

The operation or action of the engine revolution number control system 40 described above will now be described.

Figure 5:
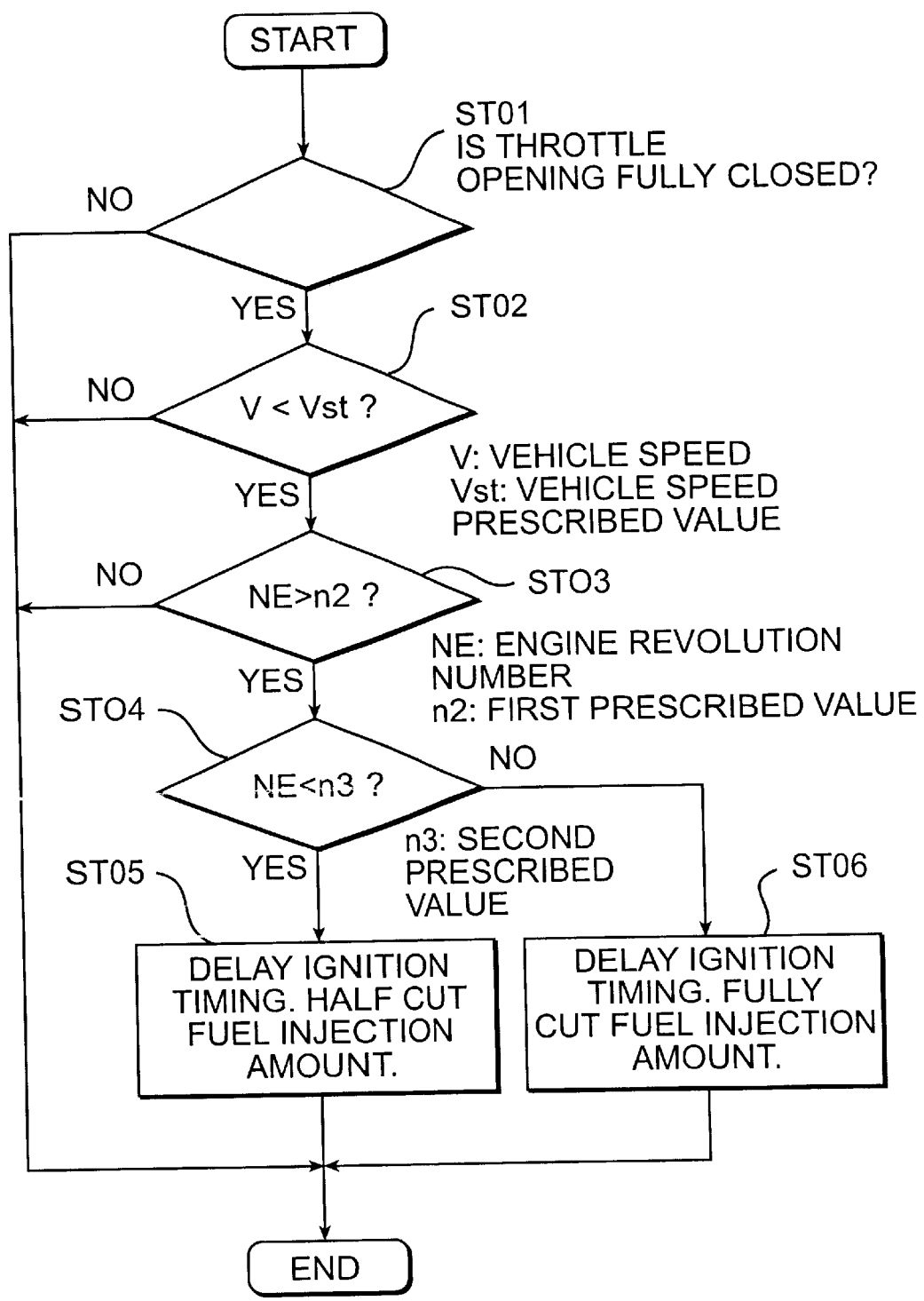
FIG. 5 is a flow chart of the ignition timing delay control and fuel supply amount reduction control of the revolution number control system for the engine according to the present invention.

FIG. 5 is a flow chart of the ignition timing delay control and fuel supply amount reduction control of the revolution number control system for the engine according to the present invention. In the flow chart, STxx are step numbers.

ST01: In the condition where the engine has been started, it is judged whether the throttle opening is fully closed, namely, whether the throttle opening sensor has detected no change in the throttle opening.

Where the throttle opening is not fully closed (NO) (namely, where the throttle opening sensor has detected a change in the throttle opening), the process goes to END.

Where the throttle opening is fully closed YES) (namely, where the throttle opening sensor has detected no change in the throttle opening), ST02 is entered.

ST02: It is judged whether the vehicle speed V is less than a vehicle speed prescribed value Vst.

Where the vehicle speed V is not less than the vehicle speed prescribed value Vst (NO), namely, where the vehicle speed V is equal to or greater than the vehicle speed prescribed value Vst, the process goes to END.

Where the vehicle speed V is less than the vehicle speed prescribed value Vst (YES), ST03 is entered.

ST03: It is judged whether the engine revolution number NE is equal to or greater than the first prescribed value n2.

Where the engine revolution number NE is not equal to or greater than the first prescribed value n2 (NO), namely, where the engine revolution number NE is less than the first prescribed value n2, the process proceeds to END.

Where the engine revolution number NE is equal to or greater than the first prescribed value n2 (YES), ST04 is entered.

ST04: It is judged whether the engine revolution number NE is less than the second prescribed value n3.

Where the engine revolution number NE is less than the second prescribed value n3 (YES), ST05 is entered.

Where the engine revolution number NE is not less than the second prescribed value n3 (NO), namely, where the engine revolution number NE is equal to or greater than the second prescribed value n3, ST06 is entered.

ST05: The ignition timing delay controlling means 41 is operated to delay the ignition timing, and the fuel supply amount reducing means 42 is operated to reduce by ½ (½ cut) the amount of fuel injected (the amount of fuel supplied) from the fuel injection valve 18.

ST06: The ignition timing delay controlling means 41 is operated to delay the ignition timing, and the fuel supply amount reducing means 42 is operated to reduce fully (cut fully) the amount of fuel injected (the amount of fuel supplied) from the fuel injection valve 18.

In the case where the throttle opening is not fully closed in ST01, the result of ST02 is not V<Vst and the result of ST03 is not NE≧n2, the delaying of the ignition timing and reduction of the amount of fuel supplied are not conducted, and the process is finished.

As has been described above referring to FIGS. 2 and 3, the present invention resides in the engine revolution number control system 40 for the engine 10 comprising the centrifugal clutch 23 connected when the revolution number of the engine 10 reaches a preset revolution number, and the throttle opening sensor 27 for detecting a change in the throttle opening of the engine 10, wherein the revolution number control system 40 comprises the ignition timing delay controlling means 41 for delaying ignition timing from the ignition advance amount t at the first prescribed value n2 when the engine revolution number NE is between the first prescribed value n2 and the clutch-on revolution number n4 (inclusive of the first prescribed value n2), where the first prescribed value n2 is a predetermined revolution number smaller than the preset revolution number and said clutch-on revolution number n4 is the preset revolution number, and revolution number is controlled by operating the ignition timing delay controlling means 41 when the throttle opening sensor 27 doest not detect a change in the throttle opening.

With the above constitution, when the throttle opening sensor 27 does not detect a change in the throttle opening (namely, the throttle opening is fully closed) and the engine revolution number NE is raised from an idle revolution number n1 for some reason and, as a result, the engine revolution number NE is between the first prescribed value n2 and the clutch-on revolution number n4, ignition timing is delayed from the ignition advance amount t at the first prescribed value n2, whereby the revolution number NE of the engine 10 can be prevented from reaching the clutch-on revolution number n4, and needless connection of the centrifugal clutch 23 can be prevented.

Therefore, in comparison to the conventional method of preventing a rise in the engine revolution number by increasingly correcting the amount of fuel, the revolution number of the engine 10 can be controlled with high accuracy without being affected by stagnation of fuel in an intake pipe or the like.

Moreover, the present invention is characterized in that fuel supply amount reducing means 42 for reducing the amount of fuel supplied to the engine 10 at the time of delaying the ignition timing by the ignition timing delay controlling means 41 is provided in addition to the ignition timing delay controlling means 41, in the engine 10 provided with the catalyst 22 for cleaning exhaust gas.

Although the temperature of exhaust gas is raised due to after-burning when the ignition timing is delayed, by reducing the amount of fuel supplied it is possible to suppress the rise in the temperature of the exhaust gas and thereby to prevent the temperature of the catalyst. 22 from being excessively raised. Therefore, life of the catalyst 22 can be prolonged.

Incidentally, while the ignition timing delay control by the ignition timing delay controlling means 41 and the fuel supply amount reduction control by the fuel supply amount reducing means 42 are carried out simultaneously in the mode of carrying out the invention, this is not limitative. For example, only the ignition timing delay control by the ignition timing delay controlling means 41 may be carried out where the engine revolution number NE is not less than the first prescribed value n2 or is between the first prescribed value n2 and the clutch-on revolution number n4 (inclusive of the first prescribed value n2).

The present invention with the above-described constitution produces the following effects.

The revolution number control system for the engine according to the present invention includes the ignition timing delay controlling means for delaying ignition timing from the ignition timing at a first predetermined revolution number when the engine revolution number is between the first predetermined revolution number and the second predetermined revolution number, where the first predetermined revolution number is a predetermined revolution number smaller than a preset revolution number and the second predetermined revolution number is the preset revolution number. Therefore, by delaying ignition timing from the ignition timing at the first predetermined revolution number when the throttle opening change detecting means does not detect a change in the throttle opening and the engine revolution number is between the first predetermined revolution number and the second predetermined revolution number, it is possible to prevent the engine revolution number from reaching the second predetermined revolution number and thereby to prevent needless connection of the centrifugal clutch.

Therefore, in comparison to the conventional method of preventing a rise in the engine revolution number by increasingly correcting the amount of fuel, the engine revolution number can be controlled with high accuracy without being affected by stagnation of fuel in the intake pipe or the like.

Moreover, the revolution number control system for the engine according to the present invention includes the ignition timing delay controlling means that is operated so as to increase the delay amount of ignition timing according to an increase of the revolution number from the first predetermined revolution number. Therefore, by setting the first predetermined revolution number close, for example, to an idle revolution number, the delay amount in the vicinity of the idling revolution number is made small, whereby variation of revolution can be restrained. In addition, the delay amount is larger as the increase of the revolution number from the first predetermined revolution number is larger, so that the engine revolution number can be lowered swiftly.

Finally, the revolution number control system for the engine according to the present invention includes, in addition to the ignition timing delay controlling means in an engine provided with a catalyst for cleaning exhaust gas, the fuel supply amount reducing means for reducing the amount of fuel supplied to the engine at the time of delaying the ignition timing by the ignition timing delay controlling means. Therefore, although the temperature of exhaust gas is raised due to after-burning where ignition timing is delayed, the reduction of the amount of fuel supplied makes it possible to suppress the rise of the temperature of the exhaust gas, and to prevent the temperature of the catalyst from being excessively raised. Accordingly, life of the catalyst can be prolonged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A revolution number control system for an engine, comprising:

an ignition timing delay device for delaying ignition timing at or above an engine revolution number; and an fuel supply amount reducing device for reducing an amount of fuel supplied to the engine via a control signal input from the ignition timing delay device, wherein the fuel supply reducing device directly controls an amount of fuel fed to a fuel injector device using a distinct control signal based upon the control signal input from the ignition timing delay device.

2. The revolution number control system according to claim 1, wherein upon receiving the control signal from the ignition timing device, the fuel supply amount reducing device communicates the distinct control signal to the fuel injector device to thereby reduce an amount of fuel injected by the fuel injector device.

3. The revolution number control system according to claim 2, further comprising an oxygen sensor in communication with the fuel supply amount reducing device, said oxygen sensor for modifying the reduced amount of fuel injected by the fuel injector device.

4. The revolution number control system according to claim 3, wherein the oxygen sensor modifies the reduced amount of fuel injected by the fuel injector device by sending a control signal to the fuel supply amount reducing device.

5. The revolution number control system according to claim 4, wherein the control signal is determined based upon a concentration of oxygen in an exhaust gas.

6. A method for controlling engine revolution, comprising the steps of:

determining when a throttle opening is fully closed;

determining when a vehicle speed is less than a predetermined value;

detecting when an engine revolution value is equal to or greater than a first reference value;

detecting when the engine revolution value is less than a second reference value; and delaying an ignition timing and reducing an amount of fuel injected from a fuel injection value once each of the determining and detecting steps are met, wherein the amount of fuel injected is reduced by some value being less than a full amount.

7. The method according claim 6, wherein the fuel injected is reduced by half.

8. A method for controlling engine revolution, comprising the steps of:
- determining when a throttle opening is fully closed;
- determining when a vehicle speed is less than a predetermined value;
- detecting when an engine revolution value is equal to or greater than a first reference value;
- detecting when the engine revolution value is not less than a second reference value; and
- delaying an ignition timing and eliminating an amount of fuel injected from a fuel injection value once each of the determining and detecting steps are met.

9. A revolution number control system for an engine, comprising:
- a centrifugal clutch connected when an engine revolution number reaches a preset revolution number;
- throttle opening change detecting means for detecting a change in a throttle opening of the engine; and
- ignition timing delay controlling means for delaying ignition timing from the ignition timing at a first predetermined revolution number when the engine revolution number is between a first predetermined revolution number and a second predetermined revolution number, wherein said first predetermined revolution number is a predetermined revolution number smaller than said preset revolution number and said second predetermined revolution number is said preset revolution number,
- wherein said revolution number control system controls the engine revolution number by operating said ignition timing delay controlling means when said throttle opening change detecting means does not detect a change in the throttle opening.

10. A revolution number control system for an engine as set forth in claim 1, wherein said ignition delay controlling means increases delay amount of ignition timing according to an increase in revolution number from said first predetermined revolution number.

11. A revolution number control system for an engine as set forth in claim 1, further comprising fuel supply amount reducing means for reducing an amount of fuel supplied to the engine at the time of delaying the ignition timing by said ignition timing delay controlling means.

* * * * *